(12) United States Patent
Abraham

(10) Patent No.: US 7,074,478 B2
(45) Date of Patent: Jul. 11, 2006

(54) OPTICAL ENCODING

(75) Inventor: Nigel Christopher Abraham, Hartlepool (GB)

(73) Assignee: Fryco Limited, Washington (GB)

( * ) Notice: Subject to any disclaimer, the term of this patent is extended or adjusted under 35 U.S.C. 154(b) by 436 days.

(21) Appl. No.: 10/312,710

(22) PCT Filed: Jun. 21, 2001

(86) PCT No.: PCT/GB01/02769

§ 371 (c)(1),
(2), (4) Date: Dec. 19, 2002

(87) PCT Pub. No.: WO01/99095

PCT Pub. Date: Dec. 27, 2001

(65) Prior Publication Data

US 2003/0157305 A1    Aug. 21, 2003

(30) Foreign Application Priority Data

Jun. 21, 2000  (GB) .................................. 0015046.6
Dec. 5, 2000   (GB) .................................. 0029693.9
Dec. 8, 2000   (GB) .................................. 0030206.7
Dec. 18, 2000  (GB) .................................. 0030881.7

(51) Int. Cl.
*B32B 3/00*     (2006.01)
*G06K 19/06*    (2006.01)
*B42D 15/00*    (2006.01)

(52) U.S. Cl. .................. 428/209; 428/916; 235/494; 283/73; 283/74; 283/88; 283/89

(58) Field of Classification Search ............ 428/195.1, 428/209, 210, 916; 235/487, 494; 283/73, 283/74, 88–93
See application file for complete search history.

(56) References Cited

U.S. PATENT DOCUMENTS

| 3,916,160 | A | * | 10/1975 | Russo et al. ................. 235/494 |
| 3,971,917 | A | * | 7/1976  | Maddox et al. ........ 235/462.39 |
| 5,140,645 | A | * | 8/1992  | Whitaker .................... 382/184 |
| 5,221,833 | A | * | 6/1993  | Hecht ......................... 235/494 |
| 5,369,261 | A |   | 11/1994 | Shamir |
| 5,951,055 | A | * | 9/1999  | Mowry, Jr. .................. 283/93 |
| 6,095,425 | A | * | 8/2000  | Mowry, Jr. ................. 235/494 |
| 6,209,923 | B1| * | 4/2001  | Thaxton et al. ............... 283/72 |
| 6,324,004 | B1| * | 11/2001 | Staub et al. ................ 359/567 |

FOREIGN PATENT DOCUMENTS

| EP | 0549315 A1 | 6/1993 |
| EP | 0785525 A2 | 7/1997 |
| EP | 0785526 A2 | 7/1997 |
| EP | 0887765 A2 | 12/1998 |
| EP | 0940810 A1 | 9/1999 |
| WO | WO 91/14998 A1 | 10/1991 |
| WO | WO 97/37321 A1 | 10/1997 |

* cited by examiner

*Primary Examiner*—Stephen Stein
*Assistant Examiner*—Timothy M. Speer
(74) *Attorney, Agent, or Firm*—Edwin D. Schindler

(57) ABSTRACT

A substrate, such as a document of value, carries a design feature (F), which includes an array of repeating patterns with the patterns exhibiting discrete differences in one or more visual characteristics, for example, shape, color or optical responses, according to a predetermined pattern. The differences are, preferably, indiscernible to the unaided eye, but can be discriminated by an optical reading machine. In an alternatively preferred embodiment, the visual characteristics of each pattern represent 8- or 16-bit information.

9 Claims, 3 Drawing Sheets

OPTICAL ENCODING

The present invention relates to encoding of optical form and more particularly to substrates or articles provided with such encoding.

Various forms of optical encoding have been proposed hitherto, perhaps the most well-known being the bar code, consisting of a series of parallel black bars of distinctly different widths and spacings. These known forms of optical encoding do however exhibit various drawbacks, including the fact that they are visually obtrusive.

We have now devised a form of optical encoding which is visually discrete and may be disguised to such an extent that the casual viewer is unaware that there is any encoding present.

In accordance with the present invention, there is provided a substrate or other article which carries, on a surface thereof, a design feature which comprises an array of repeating patterns, said patterns exhibiting discrete differences in one or more visual characteristics according to a predetermined code.

In one form, the different patterns of the design feature exhibit differences in shape and/or size. Thus, the different patterns of the design feature may be of selected shapes and/or sizes, the selection of such shapes and/or sizes being in accordance with a predetermined coding protocol, whereby different substrates or articles may be uniquely encoded, for example in accordance with a numbering system.

The differences in shape and/or size of the patterns of the design feature are preferably substantially indiscernible to the unaided human eye: this may be due to the complexity of the patterns or because they are relatively small in size. However, optical reading machines, e.g. based on systems using optical character recognition software, may be arranged to discriminate between patterns having very minor differences in shape and/or size (the patterns being otherwise of identical shape and/or size).

The design feature may include a background pattern or image, over which the repeating patterns are superimposed. Additionally or instead, the design feature may include an overlay, for example comprising alpha-numeric characters, superimposed over the array of repeating patterns. These measures help to further disguise the minor differences in shape and/or size between the various patterns of the design feature, and can be provided without affecting the shape of the different patterns of the design feature or the ability of the optical reading machines to discriminate between them and so decode the encoded information: for example, the overlay may be provided as a half-tone or as a semi-transparent overprinting.

Preferably the repeating pattern is of a complex, preferably regular shape: for example it may be in the form of a star having a number of radiating points. In a binary coding system, each star may have either a first or a second number of radiating points, for example either 30 or 31 points. If there are a total of 32 stars in the array, then this system provides for 4.3 billion unique codes or numbers. The code or number preferably includes a checksum, to ensure reliability.

Instead of using stars which differ in respect of the number of radiating points, the patterns of the design feature may comprise stars which differ in shape in some other way, such as by having a small area absent, e.g. a nick out of the side of one or more of its radiating points. Alternatively, or in addition, the stars may differ slightly in size, rather than in shape.

In a second form, the patterns of the design feature may exhibit discrete differences in colour or shade according to the predetermined code.

Again, the different patterns of the design feature may be of selected colours or shades, the selection of such colours or shades being in accordance with a predetermined coding protocol, whereby different articles or substrates may be uniquely encoded. The patterns of the design feature are preferably of substantially the same colour or shade as each other, except for minor differences which are substantially indiscernible to the unaided human eye, yet optical reading machines with colour separation capability may be arranged to discriminate between the patterns. Simple shapes such as squares or circles may be printed with variations in colour or shade. In a simple form, the design features may comprise a block of coloured zones (e.g. square zones) which appear, to the naked eye, to be of a uniform colour, but which in fact exhibit differences in shade which are detectable by an optical reading machine.

The patterns of the design feature may exhibit differences in colour or shade and also differences in shape and/or size, in order to provide coding systems of higher order than binary systems. For example, an 8-bit coding system may be used, giving 256 characters and so enabling the storage of text: such an 8-bit system may use for different colours or shades and four variations of the shape and/or size of the repeating patterns of the design feature. The encoding may be based on a combination of coding systems e.g. binary and 8-bit systems.

In a further form, the repeating patterns of the design feature may comprise optically variable devices which exhibit differences in optical response according to the predetermined code.

For example, the repeating patterns of the design feature may comprise optically variable devices which are substantially identical except as regards the preferred angle of view or focus level. The optically variable devices preferably comprise diffraction gratings and/or zone plates exhibiting different grating angles or spatial frequencies or focus levels. Alternatively, some of the patterns may comprise optically variable devices and others are non-optically variable.

The individual optically variable devices may be provided on hot stamping foils or thermal transfer foils and applied to the substrate using hot stamping heads or thermal transfer heads.

Also in accordance with the present invention, there is provided a substrate or other article which carries, on a surface thereof, a design feature which comprises an array of repeating patterns, said patterns of the design feature exhibiting differences in visual characteristics according to a predetermined code, with the visual characteristics of each pattern representing greater than 1 bit information (preferably 8- or 16-bit information).

Preferably each pattern of the design feature is in the form of a regular array of elements, each element being of selected optical response. For example, each element of each pattern may be either present or absent, or each element may comprise an optically variable device of either of two responses, or either an optically variable device or the absence of such a device. The elements of each pattern may be arranged as a series in a ring or loop, preferably equally spaced-apart around the ring or loop. The elements may be arranged in two such series, in respective inner and outer rings or series. For example, each pattern may comprise a plurality of lines or sectors (preferably 8 such lines or sectors) radiating from a centre point: each such line or sector of the pattern may be present or absent, thus providing 8 bits; instead, each radiating line or sector may have inner and outer portions, with each inner portion being either present or absent and each outer portion being either present or absent. In the case of sectors, different sectors or sector-portions may be of different colours, or comprise optically variable devices of different optical responses, or comprise optically variable and non-optically variable areas. In another form, each pattern may be in the form of a star (or two stars, one within the other), each point of which may be either present or absent.

In each such design feature, one of the patterns, or a umber of the patterns in combination, may define the respective code. The code must therefore be determined from the relevant pattern, or combination of patterns, before the information carried by the remaining patterns of the design feature can be decoded. In order to improve security, the code-carrying pattern or patterns may occupy different positions in the design feature, on different end uses: the information as to the relevant position of the code-carrying elements is conveyed separately, in secure manner, to the party required to read the feature.

Thus, also in accordance with the present invention, there is provided a substrate or other article which carries, on a surface thereof, a design feature which comprises an array of repeating patterns, a plurality of said patterns exhibiting differences in one or more visual characteristics according to a predetermined code, and at least one other pattern of said array exhibiting at least one visual characteristic representing a key which defines said code.

Instead, a code may be associated with each design feature, to determine the order in which the patterns of the design feature are to be read, and/or the order in which elements of each pattern are to be read.

Thus, further in accordance with the present invention, there is provided a substrate or article which carries, on a surface thereof, a design feature which comprises an array of repeating patterns, said patterns exhibiting differences in one or more visual characteristics in accordance with a predetermined code, the design feature having a code associated therewith which determines the order in which the patterns, and/or elements of each pattern, are to be read.

The encoded design feature of the present invention may be applied to documents of value, such as tickets, train passes etc., or to articles of value, such as compact discs or CD ROM discs.

It is also envisaged that a batch of substrates or articles may all be provided with a design feature comprising an array of repeating patterns, the design feature of a majority of substrates or articles of the batch having the identical array and therefore defining the same code, whilst the design feature of a minority of substrates or articles of the batch have a corresponding array defining a different code. In this case, the differences between corresponding patterns of the two arrays (majority array and minority array) need not be discrete and may instead be readily noticeable to the unaided eye.

Thus, also in accordance with the present invention, there is provided a batch of substrates or other articles each carrying, on a surface thereof, a design feature which comprises an array of repeating patterns, the patterns of the array exhibiting differences in visual characteristics according to a predetermined code, a majority of the substrates or other articles carrying an identical said array defining a first code, and a minority of the substrates or other articles carrying a corresponding said array defining a second code.

Embodiments of the present invention will now be described by way of examples only and with reference to the accompanying drawings, in which.

Figure 1:
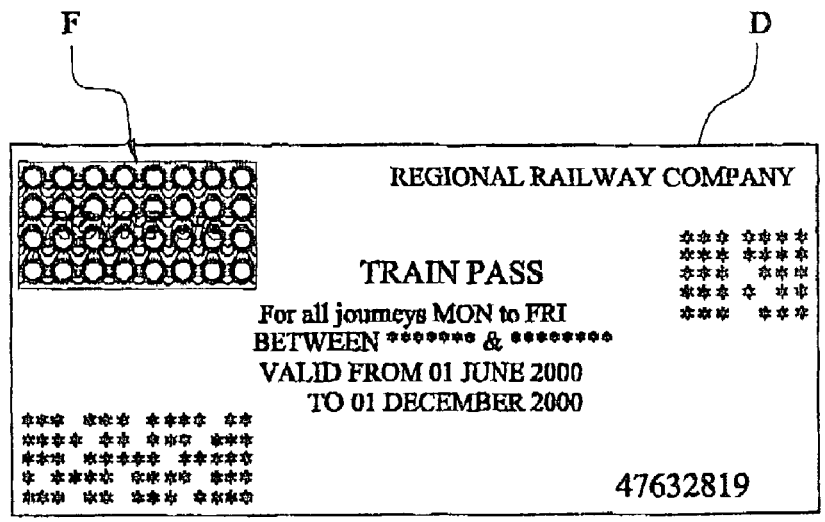
FIG. 1 is a plan view of a document of value which is formed on its front face with one embodiment of machine-readable design feature.

Referring to FIG. 1, there is shown a document of value D, for example a train pass, although the invention is applicable to any document of value or indeed to any article of value. In the example shown, the document D is imprinted over its front face, in conventional manner, with a number of items of information. Also on the front face, a machine-readable design feature F is provided.

Figure 2:
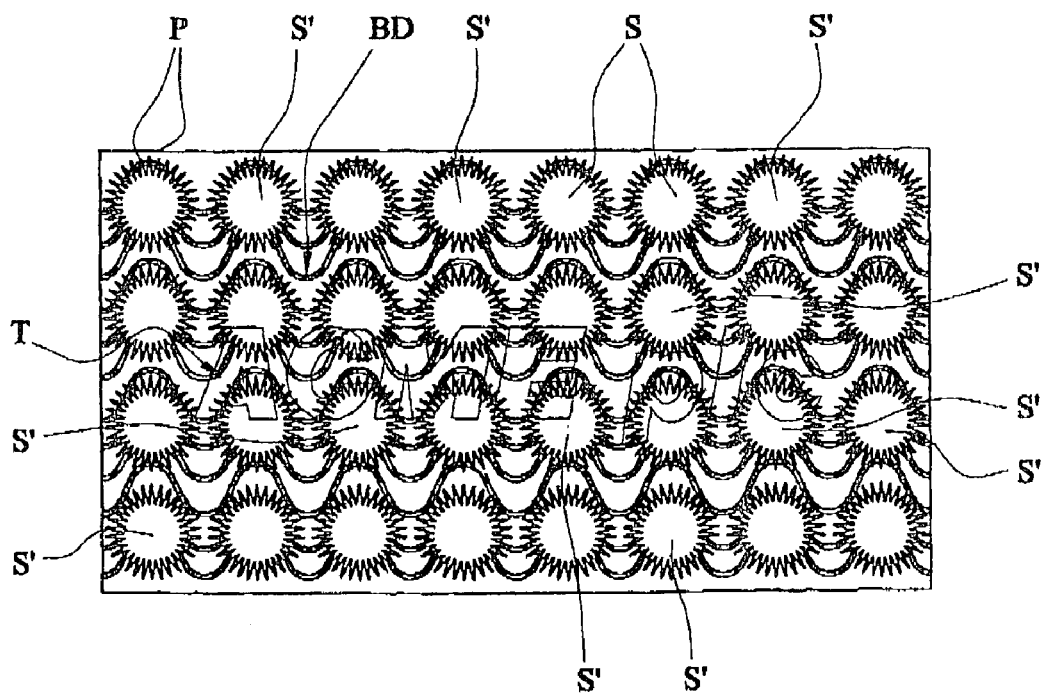
FIG. 2 is a view, on enlarged scale, of the machine-readable design feature shown in FIG. 1.

Referring to FIG. 2, the design feature F comprises, in the example shown, a two-dimensional array of a repeating pattern: in particular, the design feature comprises a 8×4 array of a repeating pattern in the form of a star S having a large number of radiating points. The stars are all of the same size; further, the stars all have 30 radiating points P, except the stars referenced S' each of which has 31 points.

The design feature F is accordingly an encoded information feature: the 32 stars provide 32 bits of information, giving the possibility (in the absence of a checksum) of 4.3 billion different codes.

It will be noted that the repeating pattern, i.e. the star S, is of a complex two-dimensional shape and the differences in shape (being the difference between 30 and 31 radiating points P) are discrete and more or less indiscernible at least to the unaided human eye. However, an optical reading machine may be arranged to read the feature and identify which of the star patterns has 30 points and which have 31 points, in order to decode the feature.

The array of repeating stars may be printed onto the document substrate using conventional printing techniques, certain techniques being more useful than others towards ensuring that each code is unique.

It will be noted that, in the example shown, the array of repeating stars is provided over a background design BD, which may take any desired form but, in the example shown, comprises a series of sinusoidal lines. It will also be noted that, in the example shown, the feature includes an overlay T in the form of text, which does not affect the shape of any of the stars or the ability of an optical reading machine to read the encoded feature. The background design BD and overlay T help to further disguise the differences between the stars S and $S^1$.

In the example shown in FIG. 2, the coding is of binary form, but other systems may be employed such as an 8-bit system which would provide for 256 characters and so allow the storage of text in encoded form. The 8-bit system may be achieved using four different colours for the stars and four variations in shape: as regards shape, all stars might have the same number of points, but with different stars having different points modified in shape, for example by having a small area omitted, such as a nick out of the side of the point.

Where the different stars (or other patterns) are of different colours, then the differences in colour are preferably subtle and substantially indiscernible to the unaided eye. For example, one pattern of the design feature may be made up of three of the process colours and another all four process colours (subtractive colour techniques). The optical reading machine then uses colour separating techniques to discriminate between the different patterns of the design feature and so decode the feature.

In another possible printing method, the individual stars or other patterns may be printed onto the substrate using inkjet printing or applied to the substrate using thermal transfer ribbons, either black ribbons or ribbons of different colours: in all these cases, the process is computer controlled so that each code is unique.

Instead of the different patterns of the design feature exhibiting differences of shape or size or colour, they may comprise optically variable devices arranged so that the different patterns of the design feature provide selected visual responses. In particular, these optically variable devices may comprises diffraction gratings and/or zone plates, for example holographic diffraction gratings exhibiting variations in grating angles or spatial frequencies or focus levels: for example, the elemental patterns may comprise zones plates focussing to different points in space. An optical reading machine may be arranged to illuminate each pattern of the design feature and pick up the different grating angles or spatial frequencies or focus levels using appropriately-positioned optical sensors.

The optically variable devices, providing the individual patterns of the design feature, may be provided on hot stamping foils and applied to the surface of the substrate or article using hot stamping heads or thermal transfer heads. For example, two or more hot stamping heads or thermal transfer heads may be used to apply optically variable devices from respective hot stamping foils or thermal transfer foils on a selective basis. The thermal transfer heads comprise an array of pins and means for heating each pin individually, independently of the others, for transferring, from the foil, a corresponding area of the optically variable layer carried on the foil: there may be two transfer heads, for two different foils, or alternatively a single transfer head using a single diffraction grating foil, the foil being turned through e.g. 30° between two orientations, to provide different patterns of the design feature with their different optical responses.

Laser or chemical etching may also be employed, either to selectively modify patterns, such as optically variable devices, pre-formed (e.g. embossed) on a substrate, or to form the entire array of patterns. For example, the substrate may be formed initially with an array of patterns, all the same as each other, then laser or chemical etching used to modify selected patterns of the array, according to the predetermined code.

Figure 3:
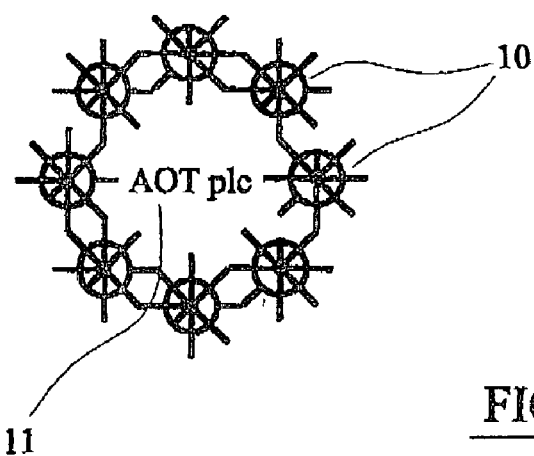
FIG. 3 is a view, on an enlarged scale, of another embodiment of machine-readable design feature.
Figure 4:
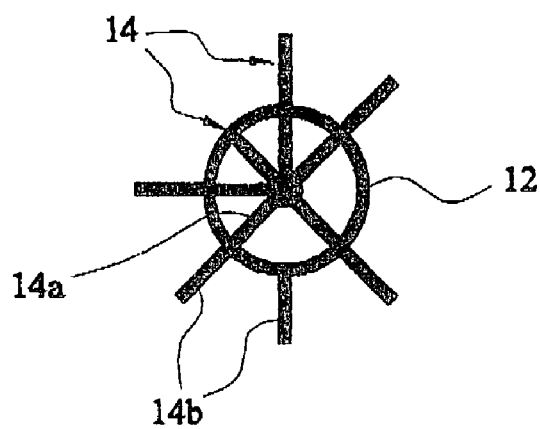
FIG. 4 is a view, on a further enlarged scale, of one of the multi-bit patterns of the design feature of FIG. 3.

FIG. 3 shows a machine-readable design feature which comprises a number of multi-bit patterns 10: in the example shown, there are 8 such patterns spaced-apart around a circle or ring. As shown in FIG. 4, each pattern of the design feature comprises a circle 12 and 8 radial lines 14, the radial lines being equi-angularly spaced. In accordance with a predetermined code, the inner portion 14a of each radial line (i.e. the portion within the circle 12) may be present or absent, and the outer portion 14b of each radial line (i.e. the portion projecting radially outwardly from the circle 12) may be present or absent. Thus, each pattern of the design feature provides 8×2=16 bits of information: the overall design feature of FIG. 3 therefore provides 8×16=128 bits of information. The presence or absence of the inner or outer portions 14a, 14b of the radial lines 14 of the patterns is in accordance with a predetermined code: an optical reading machine may be arranged to read the presences or absences of the respective portions of the respective radial lines in the respective patterns, and decode the feature. In accordance with the invention, the code may be defined by a predetermined one of the patterns of the design feature: the optical reading machine is then required to determine the code from that particular pattern, before it can decode the information carried by the remaining patterns. Which one or more of the 8 patterns of the design feature provides the code preferably varies from case-to-case. Alternatively, a code may be generated for each design feature, which determines the order in which the patterns of the design feature are read, and/or the order in which the radial lines of each pattern are read: in particular, the code may determine that the radial lines of the different patterns of the design feature are read in different orders from each other. The code for each design feature may be generated as a text file which is then passed on to the party controlling the optical reading machine, for programming that machine. It will be appreciated that the design feature (or the document etc. on which the design feature is provided) requires an element to register the direction in which it is presented to the optical reading machine: this registration element may be provided in the centre of the design feature and may comprise a logo, as shown at 11 in FIG. 3.

Instead of each pattern 10 being based on radial lines 14, it may instead comprise a number of sectors (e.g. 8 sectors) having radially inner and outer portions which are selectively "present" or "absent".

Figure 5:
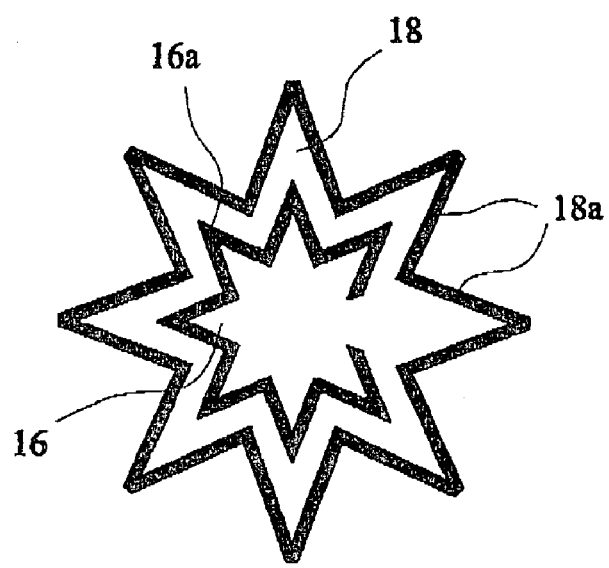
FIG. 5, is a view, similar to FIG. 4, to show another form which each of the multi-bit patterns of FIG. 3 may take.

FIG. 5 shows another form which each of the multi-bit patterns of FIG. 3 may take. The multi-bit pattern shown in FIG. 5 comprises an inner star 16 and an outer star 18: each star has 8 radiating points 16a, 18a, the points of the inner star being directed along the same radial lines as corresponding points of the outer star. In accordance with a predetermined code, each point of the inner star may be either present or absent, and each point of the outer star may be either present or absent, thus providing 8×2=16 bit information: in the example shown in FIG. 5, all points of the outer star 18 are present, whilst one point of the inner star is absent.

Figure 6:
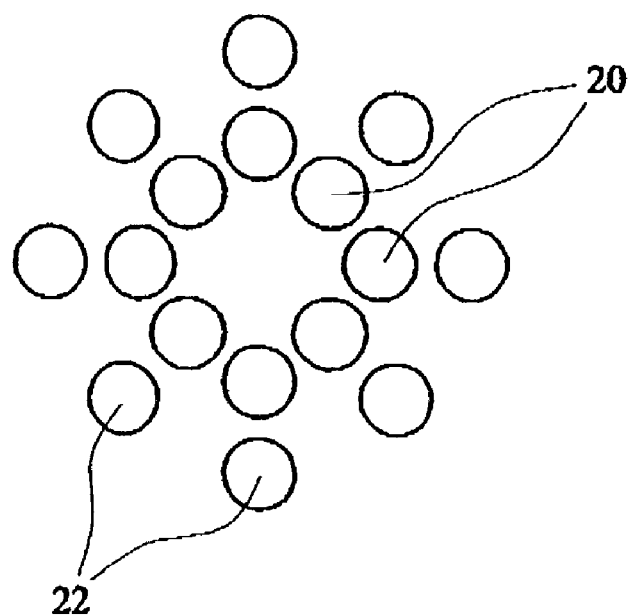
FIG. 6 is a view, similar to FIG. 4, to show a further form which each of the multi-bit patterns of FIG. 3 may take.

FIG. 6 shows a further form which each of the multi-bit patterns of FIG. 3 may take. The multi-bit pattern shown in FIG. 6 comprises an inner ring or series of 8 circles or dots 20, and an outer series of 8 circles or dots 22, the circles or dots 22 being positioned on the same radiating lines as corresponding circles or dots 20 of the inner series. In accordance with a predetermined code, each circle or dot of the inner series is either present or absent, and each circle or dot of the outer series is either present or absent, again providing each pattern with 8×2=16 bit information.

The multi-bit patterns of FIGS. 3 to 6 may be of very small size, each of the order of several millimetres diameter, such that the differences between the patterns, of which the overall design feature is formed, are often difficult for the unaided human eye to notice.

Figure 7:
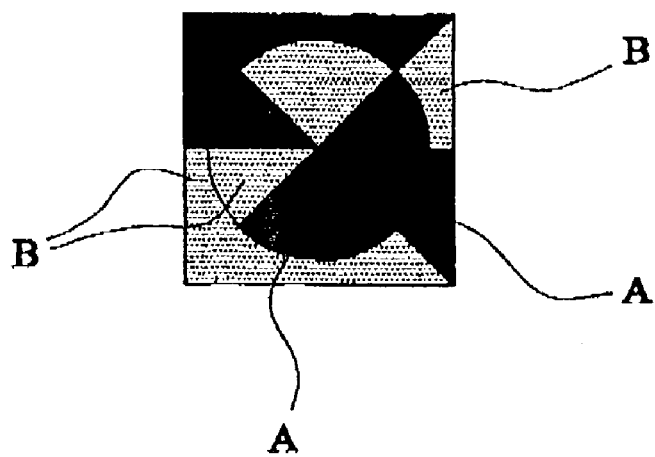
FIG. 7 is a view, similar to FIG. 4, to show a yet further form which each of the multi-bit patterns of FIG. 3 may take.

FIG. 7 shows yet a further form which each pattern of FIG. 3 may take. The multi-bit pattern of FIG. 7 has 8 sectors, each sector having respective portions inside and outside a circle 24. The inner portion of each sector comprises an optically variable device of one form A or B, whilst the outer portion of each sector comprises an optically variable device of one form A or B: again, therefore, each pattern provides 8×2=16 bit information. The optically variable devices A and B may comprise diffraction gratings and/or zone plates (for example holographic diffraction gratings) which exhibit different grating angles or spatial frequencies or focus levels. The optically variable devices A and B may be provided on respective hot stamping foils and applied to the surface of the substrate using hot stamping heads or thermal transfer heads, as described previously. In applying the optically variable devices A, B from hot stamping heads, a single foil may be used, and turned between two positions e.g. 45° apart, so that the diffraction gratings are aligned at different angles, e.g. 45° apart, for the respective areas A and B.

The elemental pattern of FIG. 7 may be of very small size, such that the differences in the elemental pattern of the overall design feature are often difficult for the unaided human eye to notice. Whilst the outer periphery of the elemental pattern is shown in FIG. 7 as a square, it may instead be circular or of any other shape. Similarly, the boundary between the inner and outer regions of the elemental pattern may be polygonal or of any other shape, instead of the circular shape shown. It will be appreciated that the dots or circles 20, 22 of the pattern shown in FIG. 6 may be formed as optically variable devices of two alternative types, as in the example of FIG. 7.

Where, in any of the embodiments which have been described, the elemental patterns are printed on substrate, they may be printed in an ink which is normally invisible to the naked eye, but which is detectable by a reading machine using light of within a predetermined wavelength range (e.g. ultraviolet or infra red light).

Where, in any of the embodiments which have been described, optically variable devices are applied to the substrate with different orientations in different areas, it is possible instead to apply such optically variable devices with like-orientations in selected areas, and maintain an absence of optically variable devices in other areas of the elemental pattern.

Where, in any of the embodiments which have been described, foils are applied to the substrate, these foils may comprise reflective (e.g. metallic foils). Such foils may be such as to reflect light directionally toward a sensor of the reading machine, or to reflect light directionally away from the reading machine.

The invention claimed is:

1. An article, comprising:
  a surface; and,
  a design feature on said surface, said design feature having an array of patterns with a basic pattern of predetermined form repeated in identical shape and size through-out said array of patterns, said basic pattern comprising a plurality of elements with, at least, a portion of said plurality of elements comprising optically variable devices and with patterns of said array of patterns exhibiting discrete differences between one another, wherein corresponding said optically variable devices of said portion of said plurality of elements of said patterns are optical responses selected according to a predetermined code, whereby said design feature encoded with information is decodable upon reading said patterns and said plurality of elements thereof in a predetermined order.

2. The article according to claim 1, wherein at least a portion of said optically-variable devices comprise diffraction gratings of selected grating angles.

3. The article according to claim 1, wherein at least a portion of said optically-variable devices comprise diffraction gratings of selected spatial frequencies.

4. The article according to claim 1, wherein at least a portion of said optically-variable devices comprise zone plates of selected focus levels.

5. The article according to claim 1, wherein each pattern or said patterns comprise a plurality of sectors radiating from a center point.

6. The article according to claim 1, wherein said array of patterns includes an additional pattern exhibiting at least one visual characteristic representing a key defining said predetermined code.

7. The article according to claim 1, wherein said design feature includes a code associated with said design feature that determines said predetermined order in which said patterns are read.

8. The article according to claim 7, wherein said code associated with said design feature further determines an order in which said plurality of elements of each said pattern are read.

9. A batch of articles, comprising:
  a plurality of articles with each article of said plurality of articles comprising a surface having a design feature on said surface, said design feature comprising an array of patterns having a basic pattern of predetermined form repeated in identical shape and size throughout said array of patterns, said basic pattern of predetermined form comprising a plurality of elements with at least a portion of said plurality of elements comprising optically variable devices, and with patterns of said array of patterns exhibiting discrete differences between one another, wherein corresponding said optically variable devices of said plurality of elements of said patterns exhibit optical responses selected according to a predetermined code, whereby said design feature encoded with information is decodable upon reading said patterns and said plurality of elements thereof in a predetermined order;
  a majority of said plurality of articles carrying an identical said array of patterns defining a first said predetermined code; and,
  a minority of said plurality of articles carrying a corresponding said array of patterns defining a second said predetermined code.

* * * * *